United States Patent [19]
Neuwirth et al.

[11] Patent Number: 5,704,458
[45] Date of Patent: Jan. 6, 1998

[54] FREEWHEEL CAGE WITH REINFORCING RING

[75] Inventors: Ernst Neuwirth, Herzogenaurach; Harald Hochmuth, Emskirchen, both of Germany

[73] Assignee: INA Walzlager Schaeffler KG, Germany

[21] Appl. No.: 647,927
[22] PCT Filed: Nov. 19, 1994
[86] PCT No.: PCT/EP94/03834
§ 371 Date: May 20, 1996
§ 102(e) Date: May 20, 1996
[87] PCT Pub. No.: WO95/16146
PCT Pub. Date: Jun. 15, 1995

[30] Foreign Application Priority Data

Dec. 6, 1993 [DE] Germany .................. 9318556 U

[51] Int. Cl.⁶ .................................. F16D 41/067
[52] U.S. Cl. .................................. 192/45; 192/41 R
[58] Field of Search .................. 192/45, 41 R, 192/45.1; 188/82.84; 384/527, 576, 557, 905

[56] References Cited

U.S. PATENT DOCUMENTS

| | | |
|---|---|---|
| 4,054,192 | 10/1977 | Johnson . |
| 4,185,724 | 1/1980 | Kitchin . |
| 4,679,676 | 7/1987 | King et al. . |
| 4,711,330 | 12/1987 | Lederman . |
| 4,724,940 | 2/1988 | Lederman . |
| 4,787,490 | 11/1988 | Lederman et al. . |
| 4,834,227 | 5/1989 | Lederman . |
| 4,850,463 | 7/1989 | Lederman . |
| 4,924,981 | 5/1990 | Johnston et al. .......... 192/45 |
| 4,986,402 | 1/1991 | Neuwirth et al. .......... 192/45 |
| 4,993,528 | 2/1991 | Lederman .......... 192/45 |
| 4,995,489 | 2/1991 | Lederman et al. .......... 192/45 |
| 5,048,651 | 9/1991 | Lederman . |
| 5,062,512 | 11/1991 | Lederman .......... 192/45 |

*Primary Examiner*—Richard M. Lorence
*Attorney, Agent, or Firm*—Bierman, Muserlian & Lucas

[57] ABSTRACT

A freewheel cage (1) arranged between two concentric metal machine components (2,3) and comprising at least one reinforcing ring (14) and a plurality of segments (4) made of an injectable or castable material and arranged on a periphery of the reinforcing ring (14), said segments (4) comprising pockets (7) for locking elements (8) defined between axial crossbars (5) and end sections (6) integral thereto, the locking elements (8) being spring-mounted between facing locking surfaces (9, 10) of the machine components (2,3) while expansion gaps (18) are formed between consecutive segments (4), and at least one sliding surface (20) associated to the freewheel cage (1) is arranged on a periphery thereof for sliding contact with a cylindrical surface (10) of one of the machine components (3), the reinforcing ring (14) is inserted into grooves (15) of the segments (4), and the segments (4) and the reinforcing ring (14) respectively comprise recesses (16) and projections (17) which engage positively with one another, characterized in that the coefficient of thermal expansion of the reinforcing ring (14) is substantially equal to that of the machine components (2,3), and the sliding surface (20) is formed on the reinforcing ring (14).

2 Claims, 2 Drawing Sheets

FREEWHEEL CAGE WITH REINFORCING RING

THE INVENTION

The present invention concerns a freewheel cage of an injectable or castable polymeric material arranged between two concentric metal machine components and comprising pockets for locking elements defined between axial crossbars and at least one end section connected integrally thereto, the locking elements being spring-mounted between facing locking surfaces of the machine components while the end section is positively engaged with at least one metal reinforcing ring arranged concentric to the machine components, the coefficient of thermal expansion of the reinforcing ring being substantially equal to that of the machine components, and at least one sliding surface associated to the freewheel cage being arranged on a periphery thereof for sliding contact with a cylindrical surface of one of the machine components.

STATE OF THE ART

Such a freewheel cage is known, for example, from EP-B-0 249 712. The reinforcing ring of this prior art cage is intended to prevent an excessive radial play of the freewheel and undesired friction thereof with one of the machine components due to different thermal expansions of the freewheel and the machine components. The thermal expansion of this known cage is restricted both in the peripheral and in the radial directions.

OBJECT OF THE INVENTION

It is an object of the invention to provide an improved freewheel cage of the aforesaid type in which a restriction of expansion of the freewheel in the peripheral directions is largely possible while, in the radial directions, expansion is prevented to the largest possible extent by the reinforcing ring.

BRIEF DESCRIPTION OF THE INVENTION

The invention achieves this object by the fact that the end section is divided in peripheral direction into a number of segments, and expansion gaps are formed between consecutive segments.

This measure assures the possibility of an unobstructed thermal expansion of the segments in the peripheral directions while restricting expansion in the radial directions. The number of segments and the width of the expansion gaps can be varied according to the conditions of operation and the given structural features. The positive engagement between the reinforcing ring and the segments assures that the segments cannot be displaced along the reinforcing ring.

In an advantageous embodiment of the invention, the reinforcing ring is inserted into grooves of the segments, and the segments and the reinforcing ring comprise recesses and projections which engage positively with one another. It is obvious that the recesses can be made by placing the reinforcing ring as well in the casting mold and spraying it with the polymeric material. The projections serve to fix the segments in the peripheral direction on the reinforcing ring.

In a freewheel cage having locking elements in the form of locking rollers and a locking ramp for each locking roller on one of the locking surfaces, it is advantageous to arrange a radial projection on each segment and an associated recess on the adjacent machine component. This measure assures that all the segments are fixed, or are only slightly displaceable in the peripheral direction relative to the machine component on which the locking ramps are arranged.

Advantageously the sliding surfaces are formed on the reinforcing ring. The advantage of such a ring is its double function which allows a separate sliding ring to be dispensed with.

DESCRIPTION OF THE DRAWINGS

The invention will now be described with the help of two examples of embodiment shown in the two figures.

FIG. 1 shows a fragmentary view of a freewheel of the invention and associated components. The freewheel cage 1 is disposed between an outer ring 2 and a concentrically arranged shaft 3 and comprises a number of segments 4 which are arranged successively in peripheral direction. Each segment 4 is composed of axially oriented crossbars 5 and circular ring segments 6. The crossbars 5 and the circular segments 6 form pockets 7 in which locking rollers 8 are arranged. The locking rollers 8 are suspended between clamping ramps 9 of the outer ring 2 and a cylindrical locking surface 10 of the shaft 3 by spring elements 11 arranged in the pockets 7. On its end facing the locking ramps 9, each segment 4 comprises a radial projection 12 which extends into a recess 13 of the outer ring 2.

Figure 1:
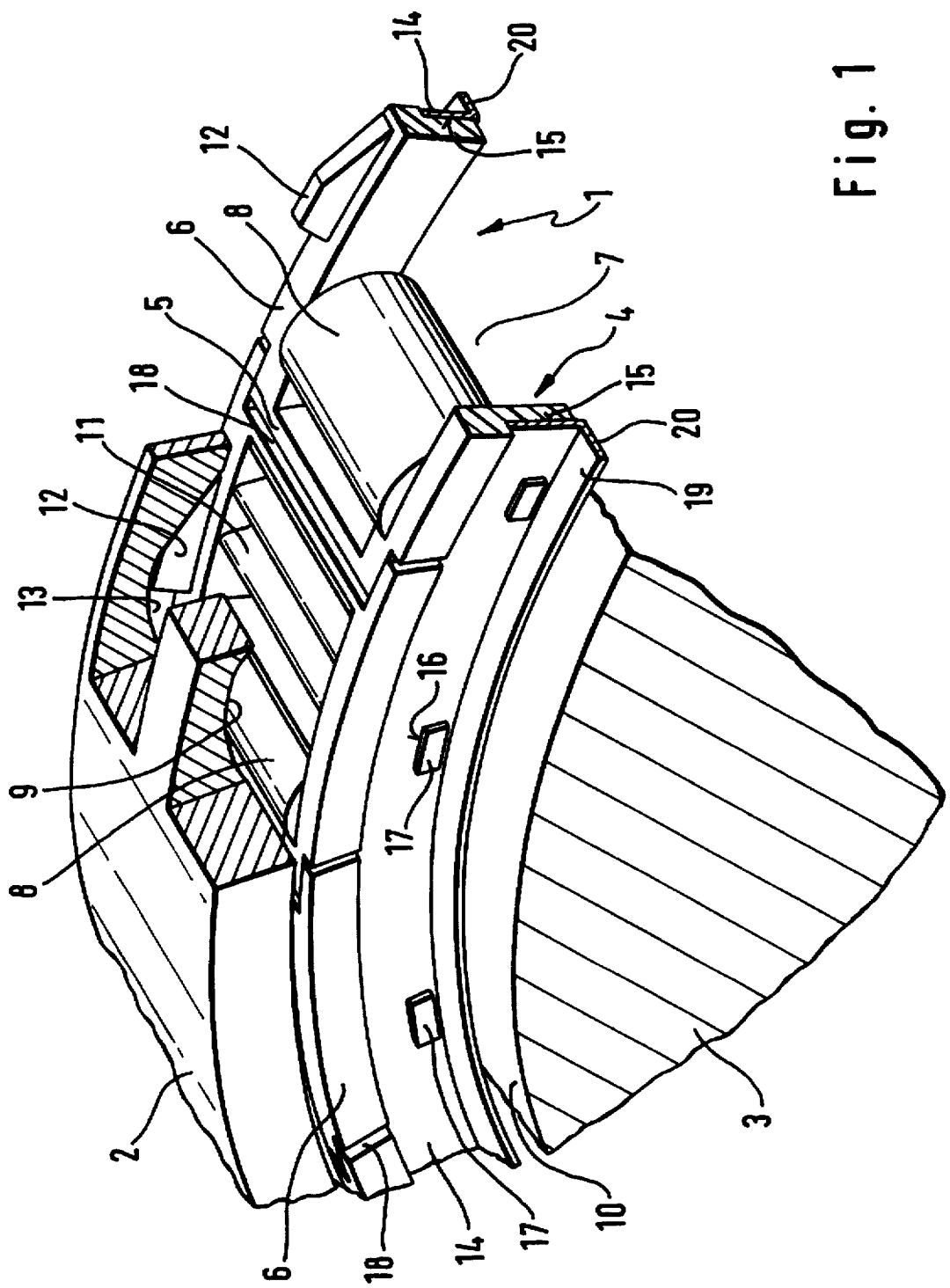
FIG. 1 is a perspective fragmentary representation of a freewheel of the invention.

The segments 4 are connected to one another by a reinforcing ring 14 inserted into grooves 15 of the segments 4. The reinforcing ring 14 comprises recesses 16 into which axial projections 17 of the segments 4 lock by positive engagement. Expansion gaps 18 are arranged between consecutive segments 4.

The shaft-proximate end of the reinforcing ring 14 is bent at an angle to form an axial flange 19 whose surface facing the shaft 3 is configured for sliding contact with the cylindrical surface of the shaft 3.

The expansion gaps 18 assure that thermal expansions of the segments 4 are possible in the peripheral directions but are only very limited in the radial directions.

Figure 2:
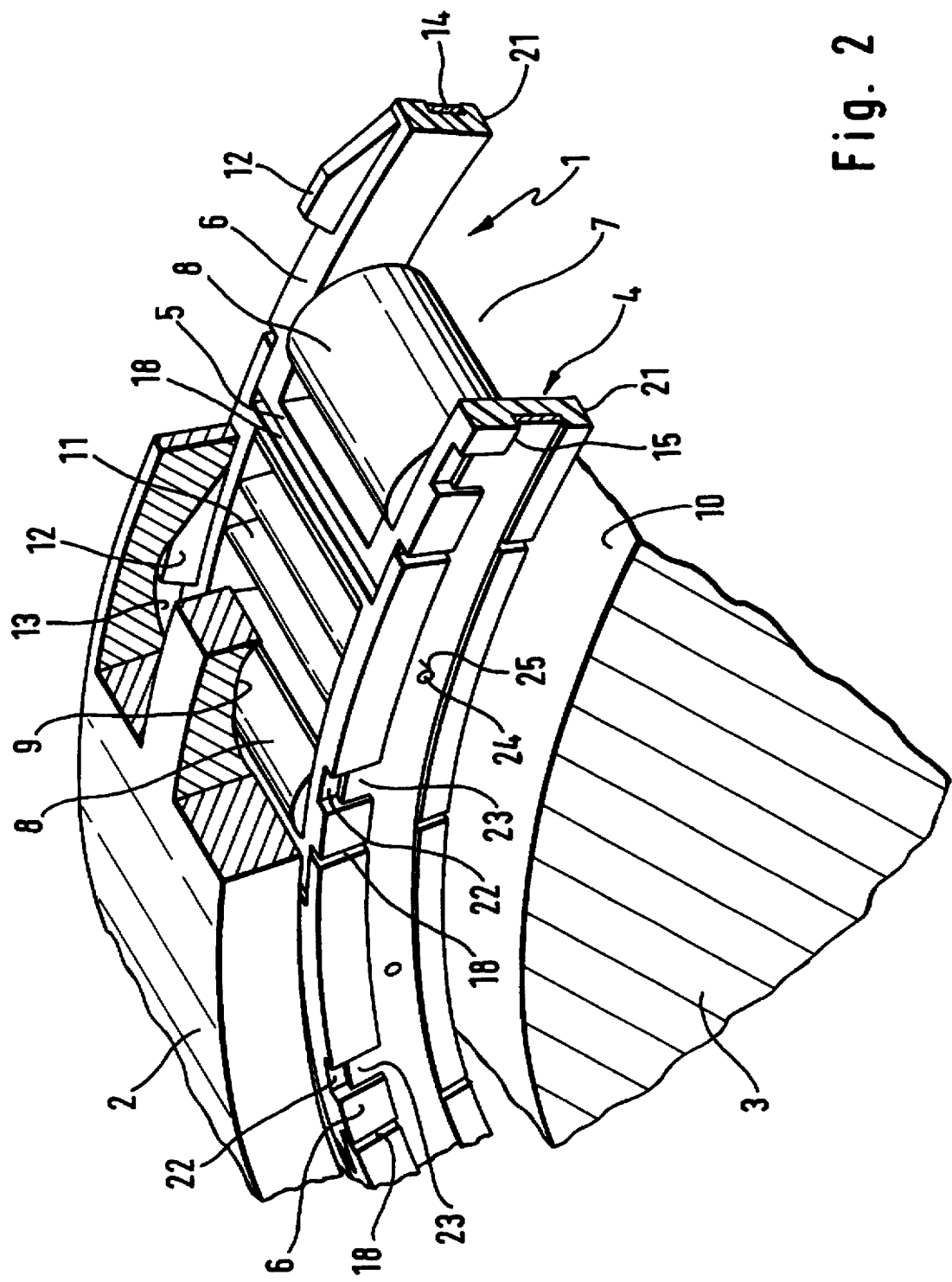
FIG. 2 is a perspective fragmentary representation of a second embodiment of the freewheel cage of the invention.

The main difference between the embodiment of FIG. 2 and the embodiment already described is that the surfaces of the circular segments 6 facing the shaft 3 are configured as a sliding surface 21 for sliding contact with the cylindrical surface of the shaft 3. Moreover, the segments comprise recesses 22 into which radial retaining lugs 23 of the reinforcing ring 14 engage positively. The segments 4 also comprise sprayed-on pegs 24 which fit into bores 25 of the reinforcing ring 14 to form an inseparable unit comprised of the segments 4 and the reinforcing ring 14.

It is obvious that the invention also applies to freewheels in which the locking ramps are formed on the inner component and the cylindrical locking surface is formed on a concentric outer component.

We claim:

1. A freewheel cage (1) arranged between two concentric metal machine components (2,3) and comprising at least one reinforcing ring (14) and a plurality of segments (4) made of an injectable or castable material and arranged on a periphery of the reinforcing ring (14), said segments (4) comprising pockets (7) for locking elements (8) defined between axial crossbars (5) and end sections (6) integral thereto, the locking elements (8) being spring-mounted between facing locking surfaces (9, 10) of the machine components (2,3) while expansion gaps (18) are formed between consecutive segments (4), and at least one sliding surface (20) associated to the freewheel cage (1) is arranged on a periphery thereof for sliding contact with a cylindrical surface (10) of one of the machine components (3), the reinforcing ring (14) is inserted into grooves (15) of the segments (4), and the segments (4) and the reinforcing ring (14) respectively comprise recesses (16) and projections (17) which engage positively with one another, characterized in that the coefficient of thermal expansion of the reinforcing ring (14) is substantially equal to that of the machine components (2,3), and the sliding surface (20) is formed on the reinforcing ring (14).

2. A freewheel cage (1) of claim 1 having locking elements in the form of locking rollers (8) and a locking surface comprised of locking ramps (9) for the locking rollers (8) wherein each segment (4) comprises a radial projection (12) to which a recess (13) of the adjacent machine component (2) is associated.

* * * * *